United States Patent [19]
Nakano et al.

[11] Patent Number: 5,983,386
[45] Date of Patent: Nov. 9, 1999

[54] ATM SWITCH AND CONTROL METHOD THEREOF

[75] Inventors: Yukio Nakano, Hachioji; Takahiko Kozaki, Koganei; Shinobu Gohara; Yoshihiro Ashi, both of Yokohama, all of Japan

[73] Assignee: Hitachi, Ltd., Tokyo, Japan

[*] Notice: This patent is subject to a terminal disclaimer.

[21] Appl. No.: 09/087,899

[22] Filed: Jun. 1, 1998

Related U.S. Application Data

[63] Continuation of application No. 08/609,995, Feb. 29, 1996, Pat. No. 5,818,853, which is a continuation of application No. 07/747,143, Aug. 19, 1991, Pat. No. 5,557,621.

[30] Foreign Application Priority Data

Aug. 17, 1990 [JP] Japan .................................... 2-215703

[51] Int. Cl.$^6$ ................................................ H03M 13/00
[52] U.S. Cl. ......................... 714/757; 714/752; 714/758; 370/352; 370/386; 370/395
[58] Field of Search ............................... 371/37.01, 37.6; 370/389, 395, 351–357, 386, 396; 714/752, 756, 757, 758

[56] References Cited

U.S. PATENT DOCUMENTS

| | | |
|---|---|---|
| 4,999,835 | 3/1991 | Lagoutte ................................. 370/389 |
| 5,062,106 | 10/1991 | Yamazaki et al. ....................... 370/397 |
| 5,097,466 | 3/1992 | Kammerl ................................ 370/474 |
| 5,119,369 | 6/1992 | Tanabe et al. .......................... 370/392 |
| 5,136,584 | 8/1992 | Hedlund ................................. 370/399 |
| 5,140,588 | 8/1992 | Danner .................................. 370/232 |
| 5,144,297 | 9/1992 | Ohara ................................ 340/825.03 |
| 5,166,926 | 11/1992 | Cisneros et al. ....................... 370/392 |
| 5,191,577 | 3/1993 | Vchida et al. .......................... 370/388 |
| 5,199,027 | 3/1993 | Barri ..................................... 370/231 |
| 5,202,885 | 4/1993 | Schrodi et al. ......................... 370/355 |
| 5,228,028 | 7/1993 | Cucchi et al. .......................... 370/392 |
| 5,230,002 | 7/1993 | Yamashita et al. ..................... 714/758 |
| 5,233,603 | 8/1993 | Takeuchi et al. ....................... 370/412 |
| 5,249,178 | 9/1993 | Kurano et al. .......................... 370/342 |

FOREIGN PATENT DOCUMENTS 267045  3/1990  Japan .
WO 88/07298  9/1988  WIPO ............................. H04I 11/20

*Primary Examiner*—Emmanuel L. Moise
*Attorney, Agent, or Firm*—Antonelli, Terry, Stout & Kraus, LLP

[57] ABSTRACT

An ATM switch including ECC encoder circuits each for generating, for an ATM cell as an information symbol, an ECC check symbol and for adding the ECC check symbol thereto, cell partitioning circuits each for subdividing an information field of an ATM cell into N partial cells, for subdividing a check symbol field into M partial cells, and for assigning an identical routing tag to the obtained partial cells (N+M) partial cell switches for respectively routing the (N+M) partial cells in an independent fashion based on the routing tag, and ECC decoder circuits for receiving the (N+M) partial cells thus routed and for achieving an error correction on the received partial cells.

7 Claims, 9 Drawing Sheets

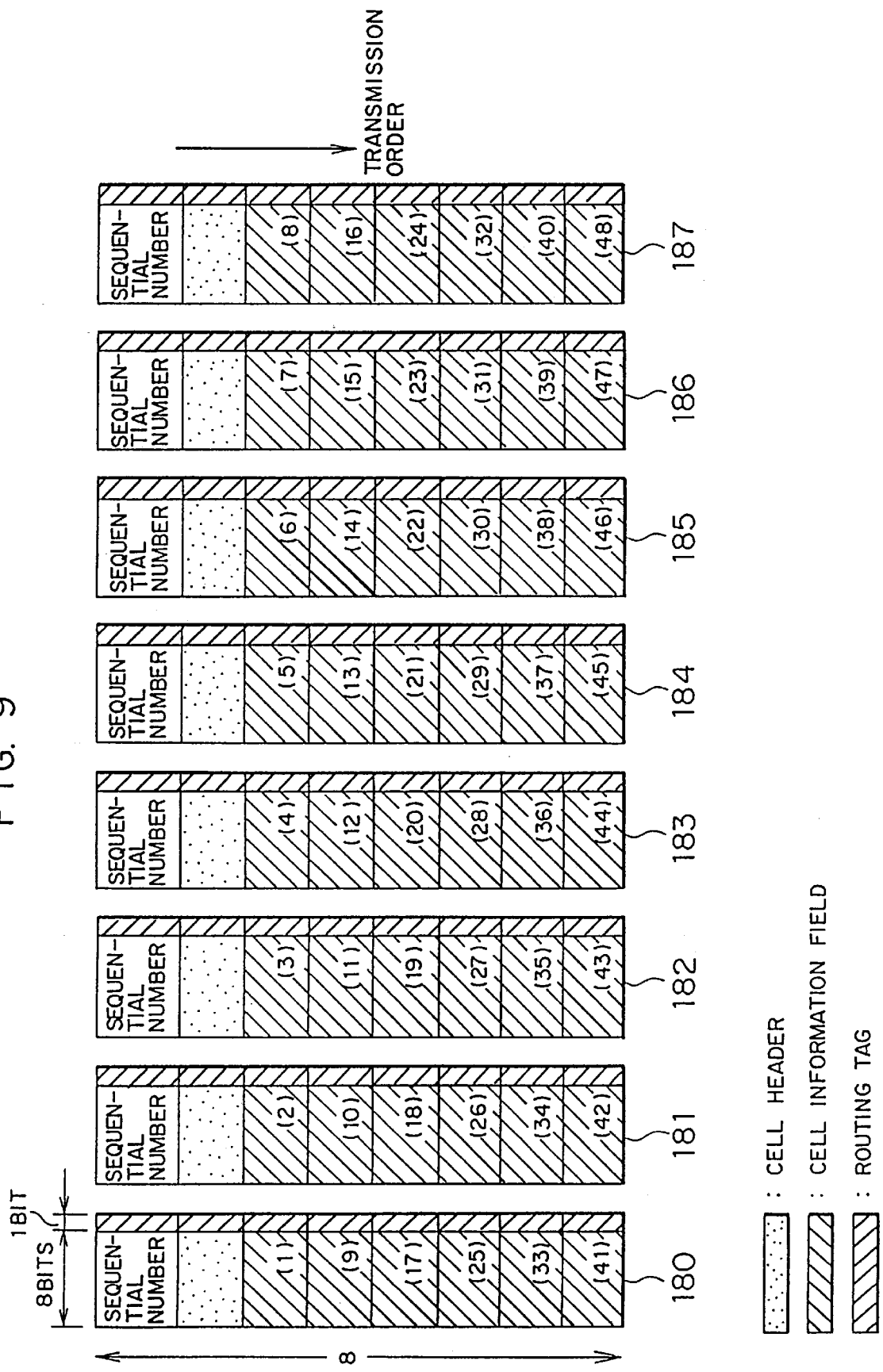

ATM SWITCH AND CONTROL METHOD THEREOF

This is a continuation of application Ser. No. 08/609,995, filed Feb. 29, 1996 now U.S. Pat. No. 5,818,853; which is a continuation of Ser. No. 07/747,143, filed Aug. 19, 1991 now U.S. Pat. No. 5,557,621.

BACKGROUND OF THE INVENTION

The present invention relates to an asynchronous transfer mode (ATM) switch in which information switching is accomplished in a unit of cells or to an ATM switch and a method of controlling the same in an ATM cross-connection system.

In an ATM switch of the prior art, each ATM cell is assigned with a routing tag so as to be routed depending on the routing tag.

As stiplulated in the CCITT Recommendation 1.432, an ATM cell is 53 bytes long. In operation inside the ATM switch, a routing tag is added thereto such that an ATM cell in the switch includes 54 to 64 bytes. The ATM cell has a period or cycle of about 44 cells for each 125 microseconds ($\mu$s) in a 150 Mb/s operation. For example, an ATM switch processing about 2800 cells in each 125 $\mu$s (equivalent to 150 Mb/s×64 lines) has a switching capacity of about 10 Gb/s. In this conventional technology, when configuring an ATM switch of such a large capacity, a plurality of unitary switch LSIs are arranged in a two-dimensional structure. Such an ATM switch has been described, for example, in an article "Development of ATM Switch LSIs for Broadband ISDN" written by J. Kamoi et al. in the Proceedings of 1990 Spring Convention of IEICE of Japan, B-443 (Mar. 18, 1990), p. 3–21. Specifically, 64 one-chip LSIs each including an 8×8 switch (150 Mb/s) are arranged in a two-dimensional constitution to construct a 64×64 switch (150 Mb/s).

In the ATM switch of the prior art, since each ATM cell is routed by use of a routing tag assigned thereto, the ATM cell is switched together with the routing tag in any situation. Consequently, the switching capacity of the unitary ATM switch is restricted by the size of a hardware system of the switch to be mounted in a one-chip LSI and the signal capacity i.e. the maximum number of input/output signals to be processed by the one-chip LSI. In order to improve the performance of the switch, the unitary switches are required to be configured in a two-dimensional form as described above. However, this is attended with a problem that the hardware size increases in proportion to a square of the switch capacity.

Meanwhile, JP-A-2-2767 (laid-open on Jan. 8, 1990) corresponding to DE-A-3742941 shows a packet switch system having input devices, one provided between a switch and each of inputs, in which the input devices serve to divide packets into sub-packets.

SUMMARY OF THE INVENTION

It is therefore an object of the present invention to provide an ATM switch which can be implemented with a hardware system having a small size even when the switching capacity is increased.

In order to achieve the object above, according to one aspect of the present invention, there is provided an ATM switch comprising cell partitioning circuits each for subdividing an ATM cell into N partial cells (N is an integer more than one) and for assigning an identical routing tag to the obtained partial cells and N partial cell switches for respectively routing the N partial cells in an independent fashion based on the routing tag.

The total switching capacity of the ATM switch is obtained by multiplying the capacity of the unitary partial cell switch by the cell partitioning value of the number of the total partition cells; consequently, there can be configured a unitary ATM switch having a remarkably large capacity by increasing the cell partitioning value.

The foregoing and other objects, advantages, manner of operation, and novel features of the present invention will be understood from the following detailed description when read in connection with the accompanying drawings.

BRIEF DESCRIPTION OF THE DRAWINGS

FIG. 9 is a schematic diagram showing the structure of partial cells employed in the fourth embodiment according to the present invention.

DESCRIPTION OF THE PREFERRED EMBODIMENTS

Figure 1:
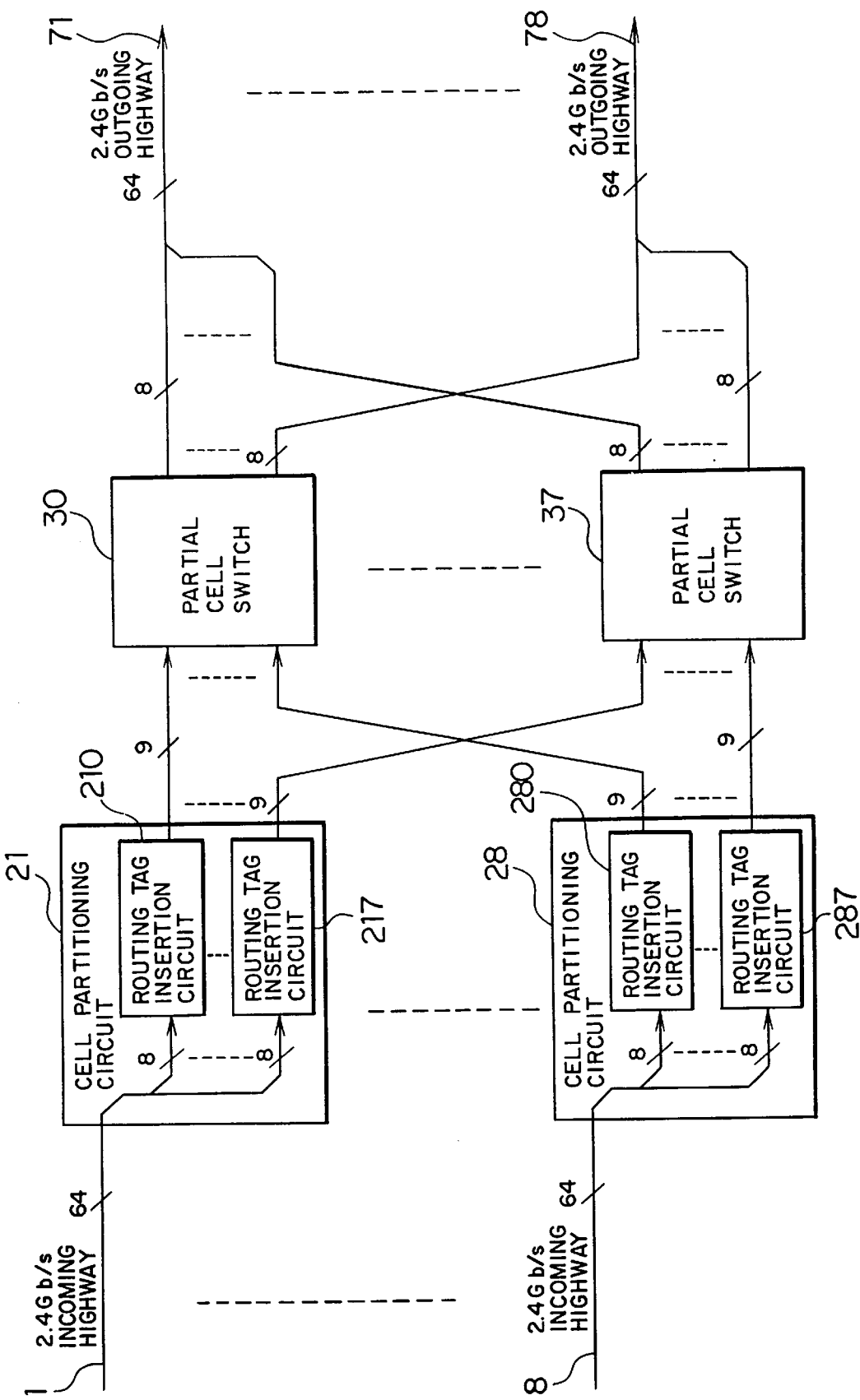
FIG. 1 is a schematic block diagram showing the constitution of an ATM switch in a first embodiment according to the present invention.

Referring now to FIG. 1, a description will be given of a first embodiment according to the present invention. The configuration of an ATM switch of FIG. 1 includes 2.4 Gb/s incoming highways 1 to 8, cell partitioning circuits 21 to 28, partial cell switches 30 to 37, and 2.4 Gb/s outgoing highways 71 to 78. The cell partitioning circuits 21 to 28 respectively include routing tag insertion circuits 210 to 217, 220 to 227, . . . , and 280 to 287.

Figure 2:
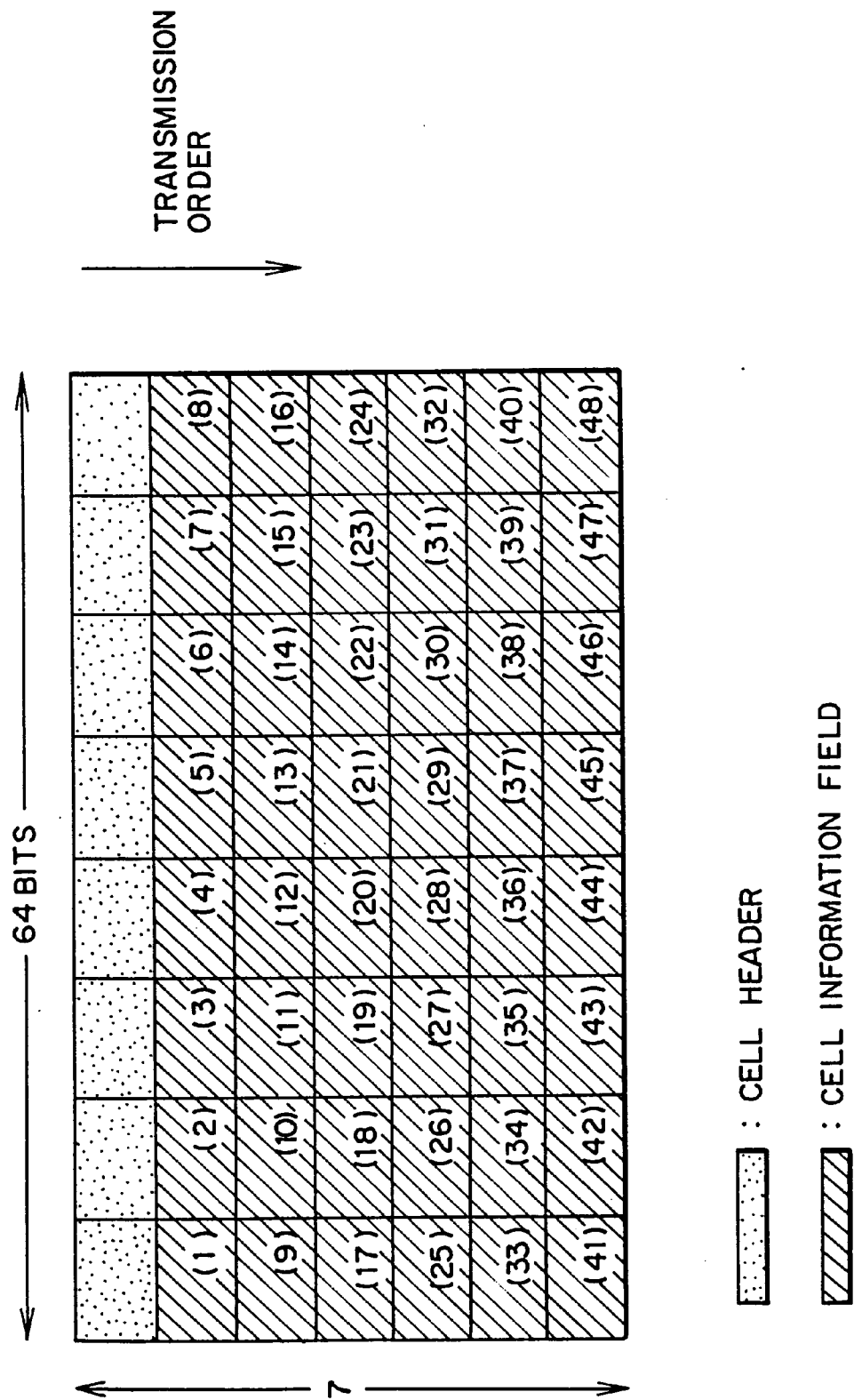
FIG. 2 is a diagram showing the structure of ATM cells used in the first embodiment according to the present invention.
Figure 3:
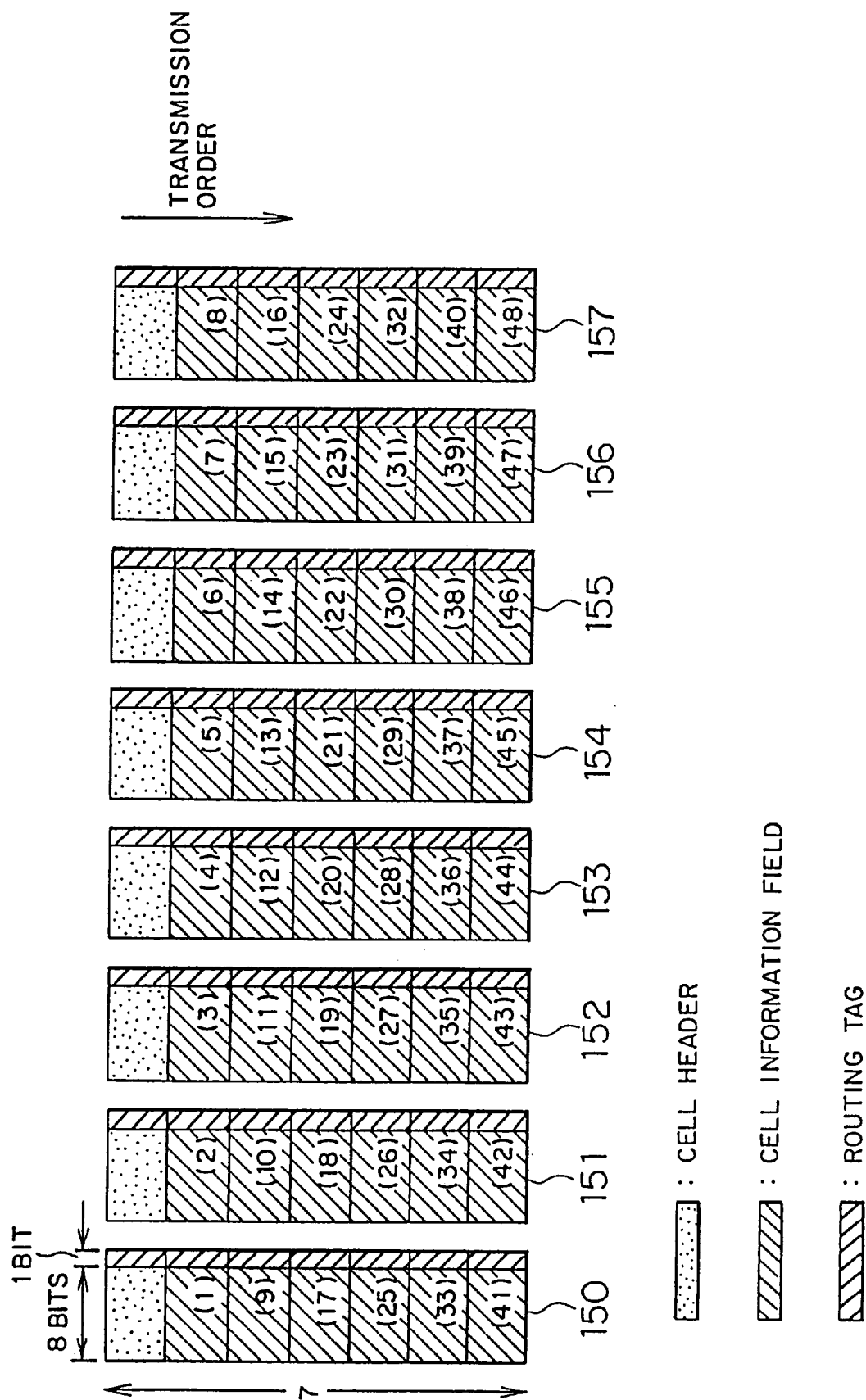
FIG. 3 is a schematic diagram showing the structure of partial cells employed in the first embodiment according to the present invention.

Next, the operation of the first embodiment will be described. Each of the 2.4 Gb/s incoming highways 1 to 8 is disposed to receive a 56-byte ATM cell in a format of "40 Mb/s×64 bits in parallel×7 rows" as shown in FIG. 2. The ATM cell includes an 8-byte cell header and 48-byte cell information field. Each of the cell partitioning circuits 21 to 28 subdivids the cell in the form at "40 Mb/s×64 bits in parallel×7 rows" into eight portions including eight bits in parallel and assign an identical routing tag thereto, thereby obtaining eight partial cells 150 to 157 as shown in FIG. 3. These partial cells are then sent to the different partial switches respectively associated therewith. For example, in the cell partitioning circuit 21, the routing tag insertion circuit 210 outputs a 0-th partial cell 150 to the partial cell switch 30 and the routing tag insertion circuit 211 supplies a first partial cell 151 to the partial cell switch 31. In the partial cell switch 30, 0-th partial cells are received respectively from the cell partitioning circuits 21 to 28 so as to achieve a switching operation on the received 0-th partial cells based on the routing tags respectively assigned thereto. In the similar manner, the partial cell switches 31 to 37 conduct switching operations respectively of the first to seventh partial cells. Since the partial cells created from a cell are assigned with an identical routing tag, all partial cell switches 30 to 37 accomplish a similar switching operation when the circuit system operates in the normal state. In consequence, the 2.4 Gb/s outgoing highways 71 to 78 simultaneously receive the respective partial cells constituting the cell.

Figure 4:
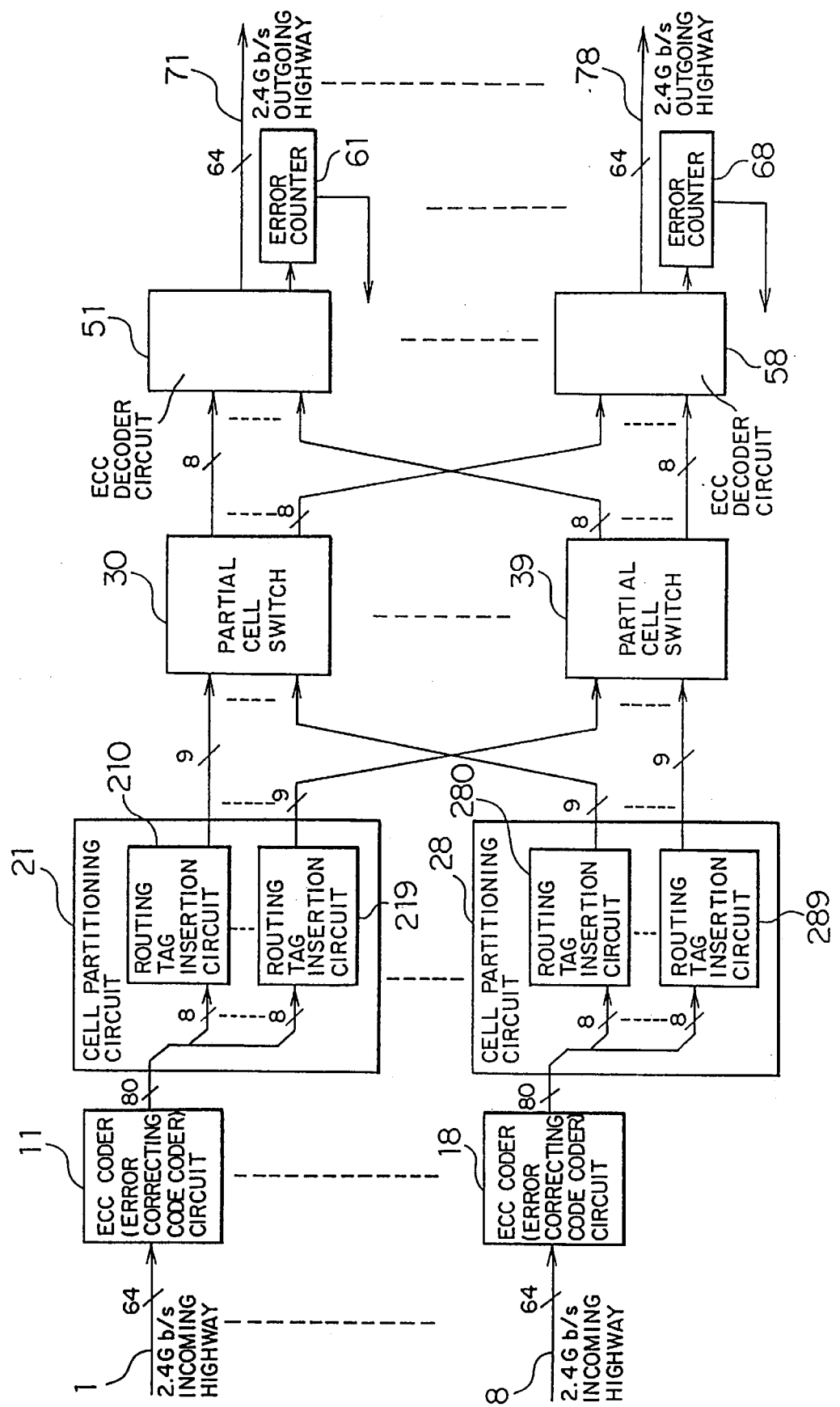
FIG. 4 is a block diagram illustratively showing the constitution of an ATM switch in a second embodiment according to the present invention.

Next, description will be given of a second embodiment by referring to FIG. 4. An ATM switch of FIG. 4 includes 2.4 Gb/s incoming highways 1 to 8, error correcting code (ECC) coder circuits 11 to 18, cell partitioning circuits 21 to 28, partial cell switches 30 to 39, ECC decoder circuits 51 to 58, error counters 61 to 68, and 2.4 Gb/s outgoing highways 71 to 78. The cell partitioning circuits 21 to 28 comprise routing tag insertion circuits 210 to 219, 220 to 229, . . ., 280 to 289, respectively.

Figure 5:
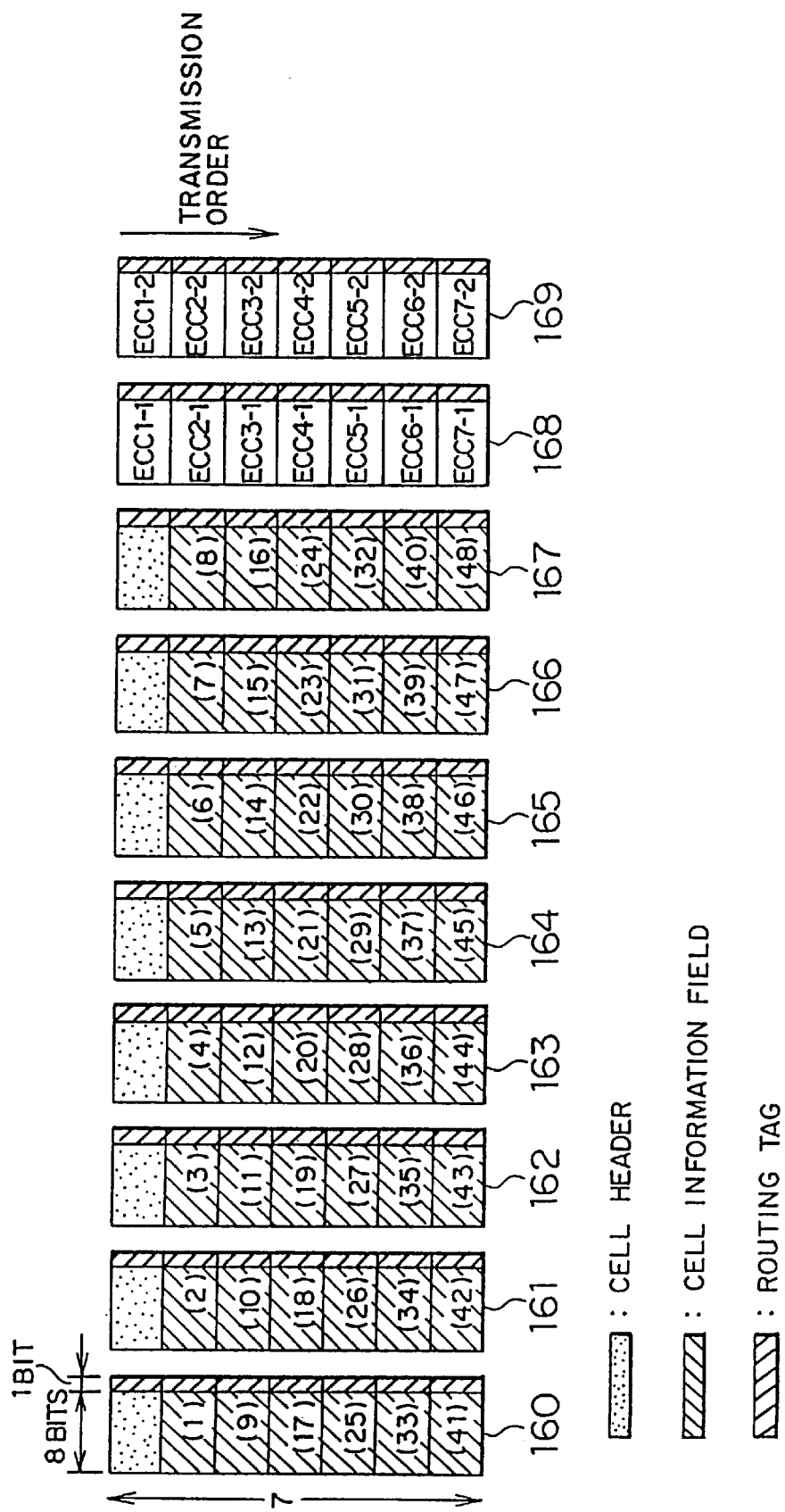
FIG. 5 is a schematic diagram showing the structure of partial cells employed in the second embodiment according to the present invention.

The operation of the second embodiment will now be described. Via the 2.4 Gb/s incoming highways 1 to 8, there is supplied a 56-byte ATM cell in the format of "40 Mb/s×64 bits in parallel×7 rows". The ECC coder circuits 11 to 18 simultaneously receive 64 bits to generate an ECC based on a 1-byte error correcting Reed-Solomon code on a Galois field $GF(2^8)$. The ECC is a shortened Reed-Solomon code created from a generator polynomial $$G(X)=(X=\alpha)(X+\alpha2)$$

where, the code length is ten bytes, the information length is eight bytes, the check symbol length is two bytes, the minimum distance is three bytes, and a is a primitive element of the Galois field $GF(2^8)$. Each of the ECC coder circuits 11 to 18 accomplishes a computation by the generator polynomial to produce a two-byte check symbol; moreover, the cell received from the pertinent highway is transformed into a format of "40 Mb/s×80 bits in parallel×7 rows" to be sent to the associated cell partitioning circuit. On receiving the cell, the cell partitioning circuit subdivides the cell in the format of "40 Mb/s×80 bits in parallel×7 rows" into ten items associated with each eight bits in parallel to assign an identical routing tag to the resultant items, thereby converting the cell into ten partial cells 160 to 169 in the format as shown in FIG. 5. The 0-th to seventh partial cells 160 to 167 are attained by inserting a routing tag into the items resultant from the cell partitioning operation. The eighth partial cell 168 and the ninth partial cell 169 are created by adding routing tags to the check symbols of the ECCs, respectively. The partial cells are thereafter transmitted to the different partial cell switches 30 to 39 respectively related thereto. For example, in the cell partitioning circuit 21, the routing insertion circuit 210 generates a 0-th partial cell 160 to be sent to the partial cell switch 30 and the routing tag insertion circuit 211 produces a first partial cell 161 to be fed to the partial cell switch 31. On receiving the 0-th partial cells respectively from the cell partitioning circuits 21 to 28, the partial cell switch 30 accomplishes a switching operation of the 0-th partial cells depending on the routing tags respectively assigned thereto, thereby delivering the 0-th partial cells to the ECC decoder circuit associated with a highway of an output destination thereof. In the similar fashion, the partial cell switches 31 to 39 carry out switching operations of the first to ninth partial cells, respectively. All partial cells constituting a cell have an identical routing tag and hence all partial cell switches perform a similar switching operation when the circuit system develops a normal operation. In consequence, the ECC decoder circuit simultaneously receives the partial cells created from the cell. For example, the ECC decoder circuit 51 is supplied with the 0-th to ninth partial cells respectively from the partial cell switches 30 to 39 so as to reconstruct a cell in the form of "40 Mb/s×80 bits in parallel×7 rows", thereby achieving a computation to decode an ECC of the Reed-Solomon code for each row. When the partial cell switches 30 to 39 normally achieve operations thereof, the partial cells generated from a cell are simultaneously inputted to the ECC decoder circuit and there does not accordingly occur any error. Consequently, the error correction is not actually conducted. However, for example, if an error takes place in a routing tag of one of the ten partial cells produced from a cell, even when the nine other cells correctly arrive at the ECC decoder circuit 51, the partial cell related to the error may not be appropriately routed and hence cannot be received by the circuit 51 at an appropriate time. In this case, since the ECC system develops a function to correct a one-byte error, the ECC decoding operation is accomplished with the nine correct partial cells to restore the content of the cell not having appropriately received. Each of the partial cell switches 30 to 39 includes a first-in first-out (FIFO) buffer, which is disposed to temporarily store a partial cell at an occurrence of a collision between partial cells. Consequently, once a wrong operation occurs due to an error of a routing tag, the order of partial cells registered to a queue in the first-in first-out buffer of the partial cell switch associated with the wrong operation may possibly be different from the order of the partial cells in a queue of any other partial cell switch in some cases. The discrepancy between the orders of partial cells in the respective queues results in that any pertinent partial cell thereafter arrives at the ECC decoder circuit 51 at a point of time different from that of the nine other partial cells. In this situation, the ECC decoder circuit 51 continuously achieves, for the partinent partial cell, a restoration of the content thereof through the one-byte error correction based on the nine partial cells received at the proper time. The discrepancy between the partial cell orders in the queues of the FIFO buffers respectively of the partial cell switches above is removed when the length of the queue in the FIFO buffer of the pertinent partial cell switch becomes zero. However, in order to cope with a case where the queue length does not become to zero for a long period of time i.e. where the discrepancy between the partial cell orders in the queues is not removed for a long period of time, the error counter 61 counts the number of error corrections per unitary period of time. When the count value is equal to or more than a predetermined value and this condition is kept continued for a period of time exceeding the preset period of time, the queue in each pertinent partial cell switch is reset. In a case where the partial cell switches are configured to be related to buffers respectively associated with outgoing highways, the system resets only the buffers of an outgoing highway associated with the condition above. The ECC decoder circuits 52 to 58 and the error counters 62 to 68 also conduct operations in the same way as described in conjunction with the ECC decoder circuit 51 and the error counter 61, respectively.

In the second embodiment, the error correction code is used to prevent an error due to a wrong operation of a partial cell switch from propagating to subsequent cells, which resultantly leads to an effect that the wrong operation of a partial cell switch hardly causes an ATM cell to be discarded.

Figure 6:
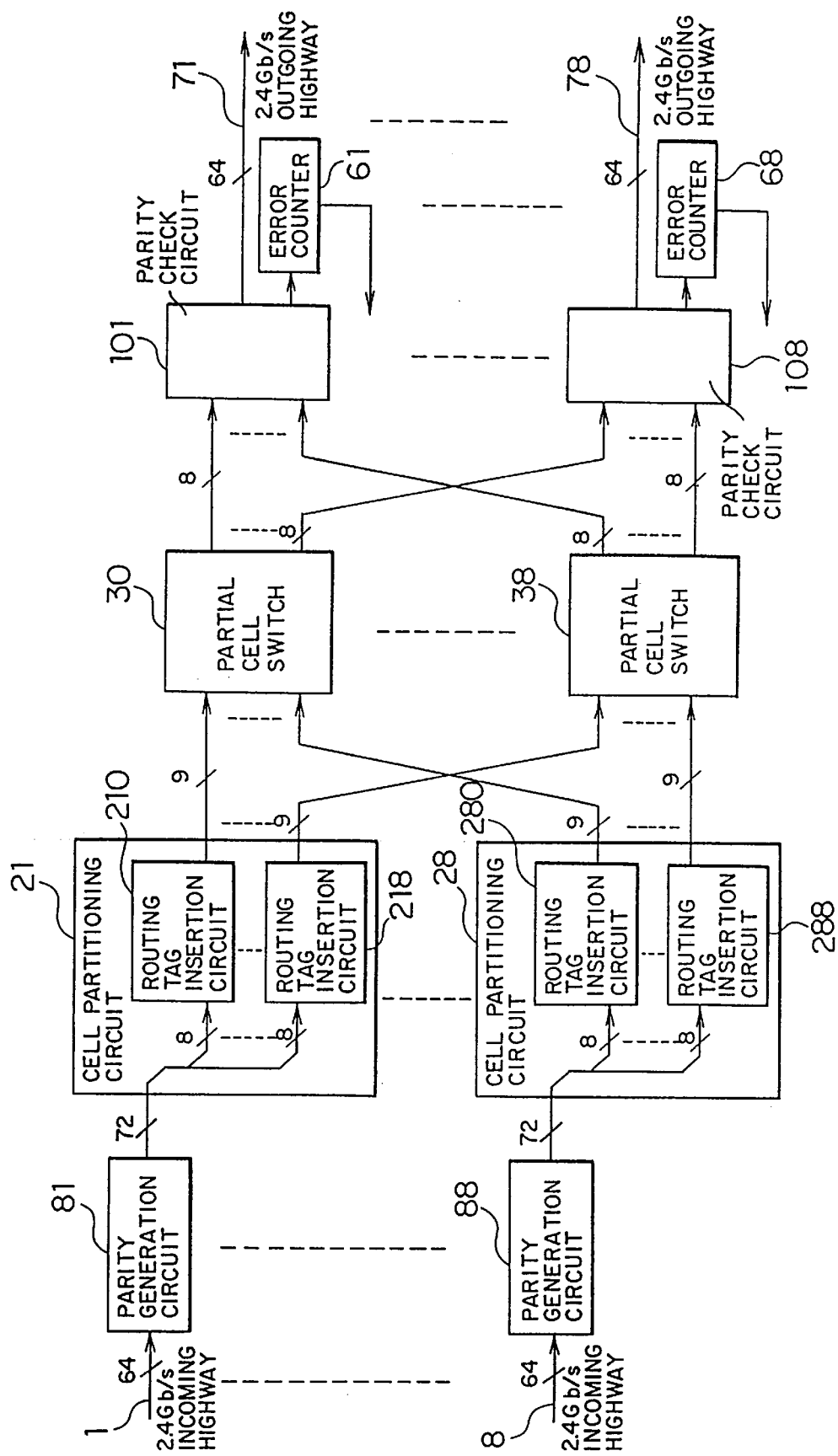
FIG. 6 is a block diagram schematically showing the configuration of an ATM switch in a third embodiment according to the present invention.

Subsequently, referring to FIG. 6, a description will be given of a third embodiment according to the present invention. The configuration of an ATM switch of FIG. 6 includes 2.4 Gb/s incoming highways 1 to 8, parity generation circuits 81 to 88, cell partitioning circuits 21 to 28, partial cell switches 30 to 37, parity check circuits 101 to 108, error counters 61 to 68, and 2.4 Gb/s outgoing highways 71 to 78. The cell partitioning circuits 21 to 28 respectively comprise routing tag insertion circuits 210 to 218, 220 to 228, . . . , and 280 to 288.

Figure 7:
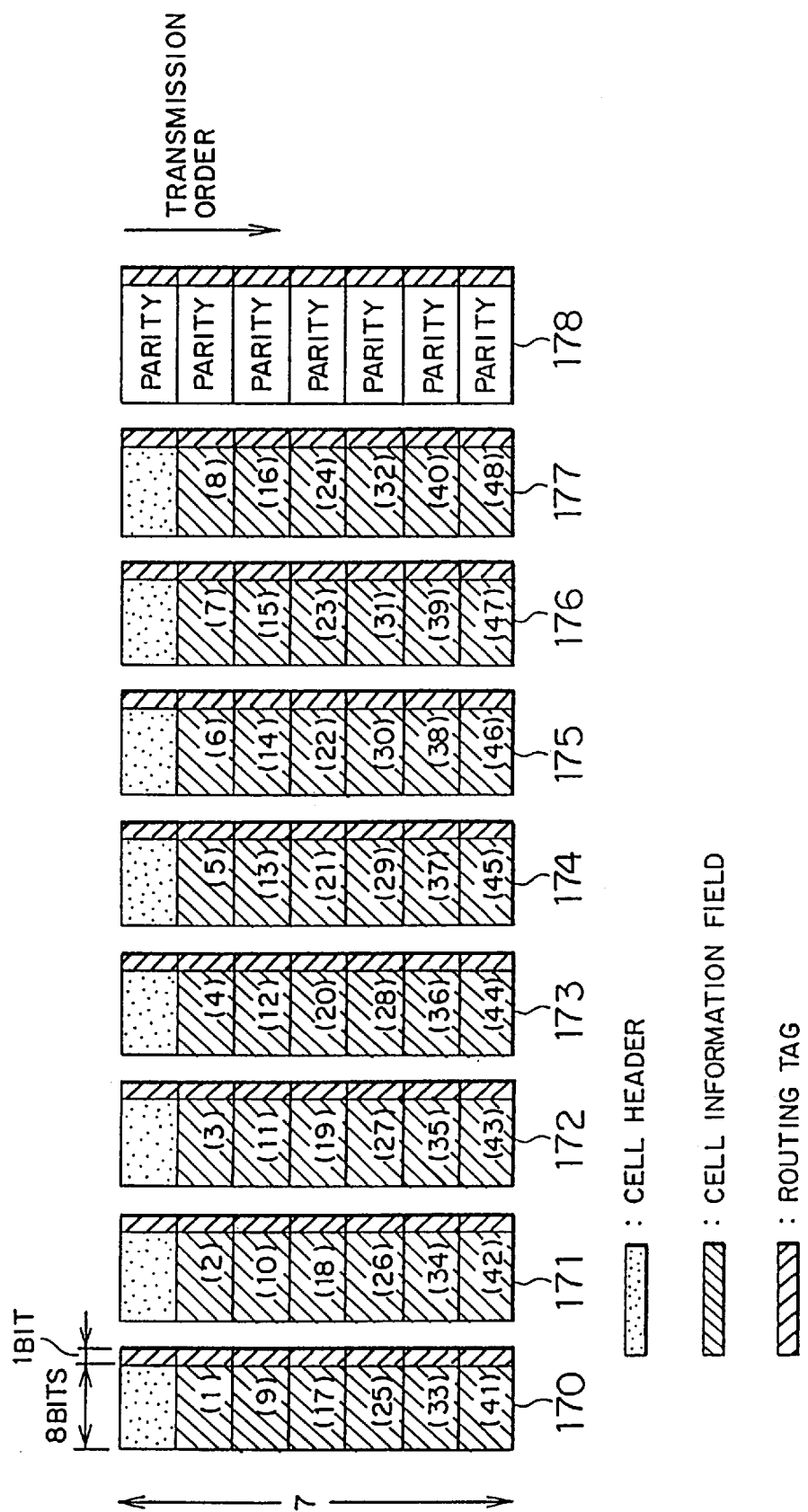
FIG. 7 is a schematic diagram showing the structure of partial cells employed in the third embodiment according to the present invention.

Next, the operation of the third embodiment will be described. Each of the 2.4 Gb/s incoming highways 1 to 8 is employed to supply a 56-byte ATM cell in a format of "40 Mb/s×64 bits in parallel×7 rows" as shown in FIG. 2. On receiving 64 bits in parallel, each of the parity generation circuits 81 to 88 generates and adds an eight-bit parity code to the received data in a bit-parallel fashion. In the parity byte configuration, an n-th bit of the parity byte (n=1 to 8) is an odd parity for the n-th bit of each byte in an associated row of the ATM cell. Each of the cell partitioning circuits 21 to 28 subdivides the cell thus including the odd parity bits in the form of "40 Mb/s×72 bits in parallel×7 rows" into nine items including eight bits in parallel and assign an identical routing tag thereto, thereby obtaining nine partial cells 170 to 178 as shown in FIG. 7. The 0-th to seventh partial cells 170 to 177 are obtained by inserting a routing tag into the items created from the cell partitioning operation. The eighth partial cell 178 is generated by adding routing tags to the parity byte. Like in the first and second embodiments, the partial cells are then transmitted to the different partial cell switches 30 to 38 respectively related thereto. On receiving the 0-th to eighth partial cells, the partial cell switches 30 to 38 accomplish a switching operation of these cells so as to send the cells to the parity check circuits 101 to 108, respectively. All partial cells resultant from a cell are assigned with an identical routing tag and hence the parity check circuit 101 simultaneously receives the partial cells created from the cell when the switches 30 to 38 are operating in the normal state. However, as described in conjunction with the second embodiment, to. cope with a wrong operation which may take place in the partial cell switch 30, the error counter 61 counts the number of error detections per unitary period of time. When the count value is equal to or more than a predetermined value and this condition is kept continued for a period of time exceeding the present period of time, the queue in each pertinent partial cell switch is reset. When the partial cell switch is constructed to be related to a buffer associated with an outgoing highway, the system resets only the buffers of a pertinent outgoing highway. The parity check circuits 102 to 108 and the error counters 62 to 68 also achieve operations in the same fashion as described in conjunction with the operations of the parity check circuit 101 and the error counter 61, respectively.

Since the system of the third embodiment detects a wrong operation taking place in any one of the partial switches based on the partly check, even at an occurrence of such an erroneous operation, the system can be rapidly restored to the normal state.

Figure 8:
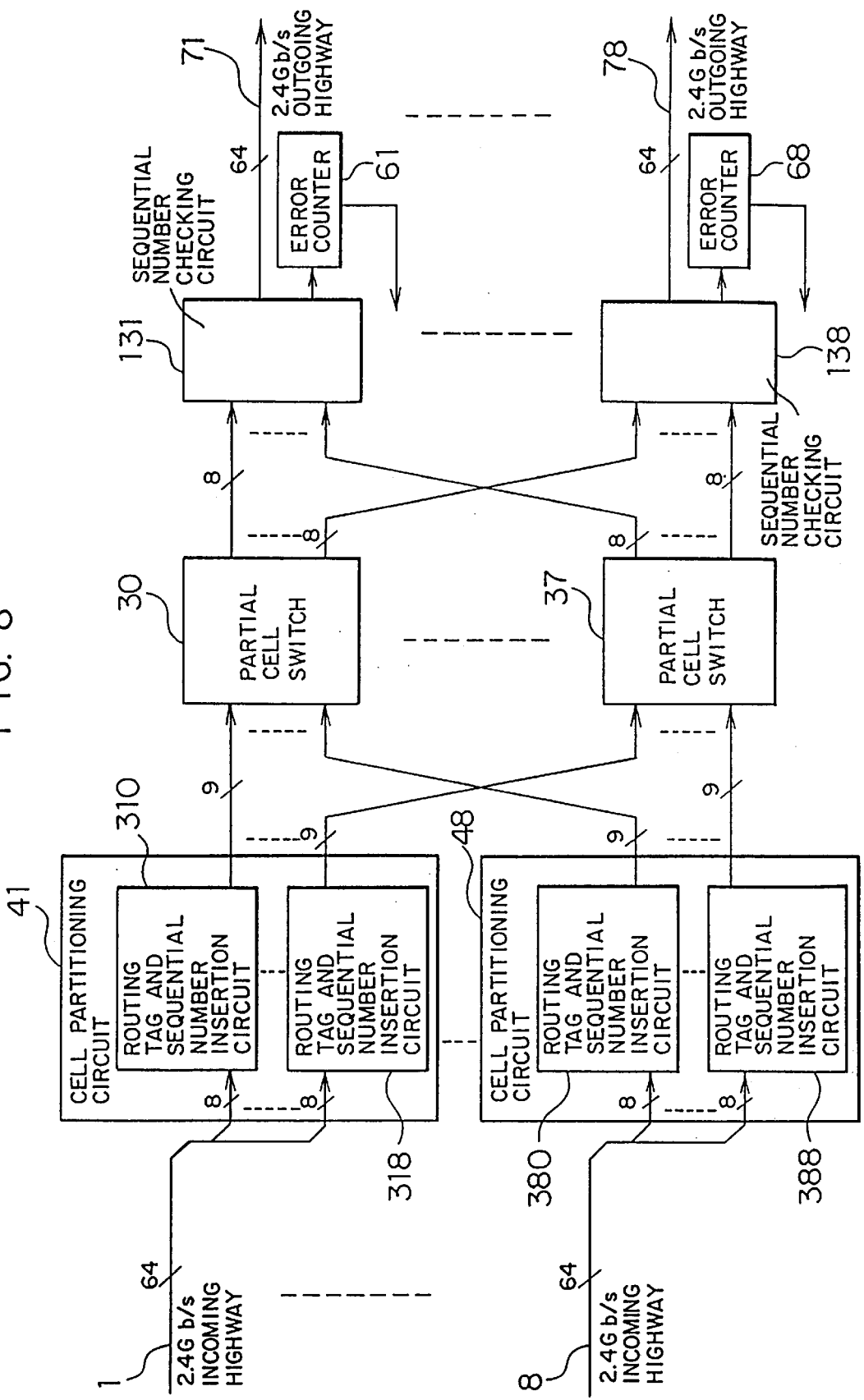
FIG. 8 is a block diagram illustratively showing the configuration of an ATM switch in a fourth embodiment according to the present invention.

Subsequently, a description will be given of a fourth embodiment according to the present invention. The structure of an ATM switch of FIG. 8 includes 2.4 Gb/s incoming highways 1 to 8, cell partitioning circuits 41 to 48, partial cell switches 30 to 37, sequential number check circuits 131 to 138, error counters 61 to 68, and 2.4 Gb/s outgoing highways 71 to 78. The cell partitioning circuits 41 to 48 are constituted with routing tag and sequential number insertion circuits 310 to 318, 320 to 328, . . . , and 380 to 388, respectively.

A description will next be given of the operation of the fourth embodiment. Each of the 2.4 Gb/s incoming highways 1 to 8 is employed to deliver a 56-byte ATM cell in a format of "40 Mb/s×64 bits in parallel×7 rows" as shown in FIG. 2. When 64 bits are received in parallel, each of the cell partitioning circuits 41 to 48 subdivides the cell in the form of "40 Mb/s×64 bits in parallel×7 rows" into eight items each including eight bits in parallel so as to assign an identical routing tag and an identical sequential number thereto, thereby obtaining eight partial cells 180 to 187 as shown in FIG. 9. The sequential number is assigned to the cells in a cyclic fashion with a period of 256 cells i.e. beginning from 0 and ending with 255. Like in the first to third embodiments, the partial cells are transmitted to the different partial cell switches 30 to 37 respectively related thereto. On receiving the 0-th to seventh partial cells, the partial cell switches 30 to 37 accomplish a switching operation of these partial cells so as to feed the partial cells to the sequential number check circuits 131 to 138, respectively, which in turn checks to determine whether or not the partial cells simultaneously received are assigned with an identical sequential number. All partial cells generated from a cell are assigned with an identical routing tag and hence the sequential number check circuit 131 simultaneously receives the partial cells created from the cell and assigned with the same sequential number when the switches 30 to 37 are operating in the normal state. However, as described in conjunction with the second embodiment, in order to cope with a wrong operation which may occur in the partial cell switch 30, the error counter 61 counts the number of sequential number mismatch errors per unitary period of time. When the count value is equal to or more than a present value and this condition is kept continued for a period of time exceeding a predetermined period of time, the queue in each partial cell switch is reset. When the partial cell switches are constructed to be related respectively to buffers associated with outgoing highways, the system resets only the buffers of an outgoing highway related to the condition above. The sequential number check circuits 132 to 138 and the error counters 62 to 68 also achieve operations in the same fashion as described in conjunction with the operations of the sequential number check circuit 131 and the error counter 61, respectively.

In the construction of the fourth embodiment, a wrong operation of any one of the partial switches is detected depending on the sequential number check. In consequence, even at an occurrence of such an erroneous operation, the system can be quickly restored to the normal state.

In general, the hardware size of a large-capacity ATM switch increases in proportion to a square of the signal transfer capacity thereof. In the ATM switch employed in each of the embodiments according to the present invention, an ATM cell is subdivided into partial cells to be routed in an independent fashion. Consequently, each partial cell switch routing either one of the partial cells has a signal transfer capacity, which is obtained by dividing the total switching capacity by the cell partitioning value. In consequence, the hardware size of the partial cell switch becomes to be about $\{1/(\text{cell partitioning value})^2\}$ of that of the switch in which the cell partitioning operation is not achieved. Resultantly, the hardware size of the overall ATM switch is about (1/cell partitioning value) of that of the switch not using the cell partitioning operation. With this provision, even when a large switching capacity is necessitated, the ATM switch can be constructed with a small hardware size.

While particular embodiments of the invention have been shown and described, it will be obvious to those skilled in the art that various changes and modifications may be made without departing from the present invention in its broader aspects.

We claim:

1. An ATM switching system for transferring an ATM cell received from one of a plurality of incoming highways to one of a plurality of outgoing highways, said ATM switching system comprising:

a plurality of cell partitioning circuits, corresponding to the incoming highways, each of which cell partitioning circuits divides an ATM cell received from one of the incoming highways into a plurality of partial cells and adds routing information to each of said partial cells, said routing information added to said partial cells being identical to one another;

a plurality of ATM switches each of which receives partial cells from each of the cell partitioning circuits and independently switches the received partial cells based on the added routing information; and a plurality of cell assemble circuits, corresponding to the outgoing highways, each of which cell assemble circuits receives switched partial cells from each of the switches and assembles the received switched partial cells into an ATM cell to be transferred to one of the outgoing highways from one of the incoming highways.

2. An ATM switching system according to claim 1, further comprising:

a plurality of error correction code generating circuits, one of which is provided between each of said cell partitioning circuits and a corresponding incoming highway; and a plurality of error correction circuits, one of which is provided for each of said cell assemble circuits, wherein a partial cell erroneously switched by any of said ATM switches is corrected to provide a correct ATM cell for transference to a corresponding outgoing highway.

3. An ATM switching system according to claim 1, further comprising:

a plurality of error detection code generating circuits, one of which is provided between each of said cell partitioning circuits and a corresponding incoming highway; and a plurality of error detection circuits, one of which is provided for each of said cell assemble circuits, wherein occurrence of an error in any of said ATM switches is detected.

4. An ATM switching system comprising:

a plurality of incoming highways;

a plurality of outgoing highways;

a plurality of cell partitioning circuits, corresponding to the incoming highways, each of which cell partitioning circuits divides an ATM cell received from one of the incoming highways into a plurality of partial cells and adds routing information to each of said partial cells, said routing information added to said partial cells being identical to one another;

a plurality of ATM switches each of which has a plurality of input lines and a plurality of output lines, each ATM switch independently transfers the partial cells received from each of the cell partitioning circuits through the input lines to the output lines based on the added routing information; and a plurality of cell assemble circuits corresponding to the outgoing highways, each of said cell assemble circuits receives switched partial cells from each of the switches through one of the output lines of the switches and assembles the received switched partial cells into an ATM cell to be transferred to one of the outgoing highways from one of the incoming highways.

5. An ATM switching system according to claim 4, further comprising:

a plurality of error correction code generating circuits, one of which is provided between each of said cell partitioning circuits and a corresponding incoming highway; and a plurality of error correction circuits, one of which is provided for each of said cell assemble circuits, wherein a partial cell erroneously switched by any of said ATM switches is corrected to provide a correct ATM cell for transference to a corresponding outgoing highway.

6. An ATM switching system according to claim 4, further comprising:

a plurality of error detection code generating circuits, one of which is provided between each of said cell partitioning circuits and a corresponding incoming highway; and a plurality of error detection circuits, one of which is provided for each of said cell assemble circuits, wherein occurrence of an error in any of said ATM switches is detected.

7. An ATM cell switching method of transferring an ATM cell received from one of a plurality of incoming highways to one of a plurality of outgoing highways in a switching system, said ATM switching method comprising the steps of:

dividing a received ATM cell into a plurality of partial cells;

adding routing information to each of the divided partial cells, said routing information added to said partial cells being identical to one another;

distributing each of the partial cells, including said routing information, to each of a plurality of ATM switches;

independently switching, in individual ATM switches, the distributed partial cells based on the added routing information of the partial cells; and receiving the switched partial cells and assembling the received switched partial cells into ATM cells, each to be transferred to one of the outgoing highways from one of the incoming highways.

* * * * *